Feb. 25, 1958  W. D. HARRISON  2,825,019
WINDSHIELD WIPER MECHANISM
Filed Nov. 27, 1953  2 Sheets-Sheet 1
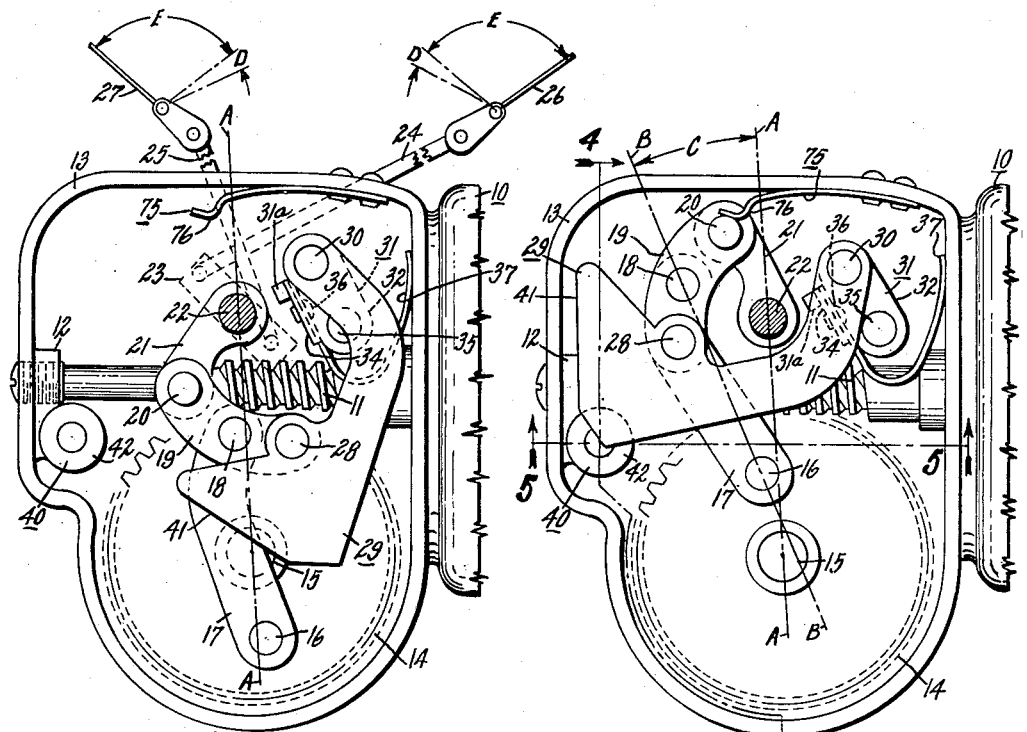
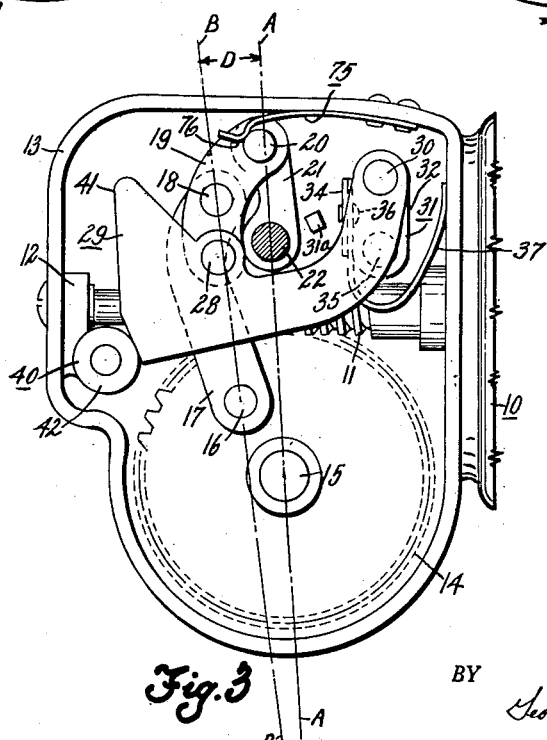
INVENTOR.
WALTER D. HARRISON
BY
George H. Strickland
HIS ATTORNEY Feb. 25, 1958  W. D. HARRISON  2,825,019
WINDSHIELD WIPER MECHANISM
Filed Nov. 27, 1953  2 Sheets-Sheet 2

INVENTOR.
WALTER D. HARRISON
BY George H. Strickland
HIS ATTORNEY

United States Patent Office 2,825,019
Patented Feb. 25, 1958

2,825,019

WINDSHIELD WIPER MECHANISM

Walter D. Harrison, Rochester, N. Y., assignor to General Motors Corporation, Detroit, Mich., a corporation of Delaware Application November 27, 1953, Serial No. 394,771

13 Claims. (Cl. 318—466)

This invention pertains to actuating mechanism for windshield wipers, and particularly to an electric motor driven actuating mechanism.

Motor vehicles are laden with accessories, both under the hood and behind the instrument panel or dashboard. Consequently, it is difficult to replace a suction actuated wiper motor with an electric motor driven actuating mechanism. This invention pertains particularly to an improved and compact arrangement of the mechanism disclosed in copending application, Serial No. 347,021, filed April 6, 1953, in the name of Dyer et al. Accordingly, among my objects are the provision of a mechanical movement adapted for actuating windshield wipers including means for varying the amplitude of oscillation imparted to a driven member, the further provision of simplified controlled means for operating the actuating mechanism of power driven windshield wipers, and the still further provision of a switch including means operable to adjust the mechanical movement so as to move the wiper blades out of the normal range of vision to a parked position.

The aforementioned and other objects are accomplished in the present invention by employing a mechanical movement of the compound linkage type, wherein the effective operating length of the connecting rod may be varied so as to vary the amplitude of oscillation imparted to a driven member. Specifically, the compound linkage includes a connecting rod, which is pivotally connected to a crank pin that is carried by the rotatable driving member. In the embodiment disclosed, the driving member takes the form of a worm gear, which is driven by a unidirectional D. C. motor. However, it is to be understood that the mechanism of this invention could be modified so as to be driven by a rotary power means other than electric motor, and the illustrated embodiment disclosing an electric motor is only exemplary.

The compound linkage also includes an arcuate operating link, the intermediate portion of which is pivotally connected to one end of the connecting rod. Opposite ends of the operating link are connected respectively to a cam member, or setting link, and the end of an arm, or lever, which is attached to the driven member, or wiper actuating shaft. The cam member, or setting link carries a pivot point, the position of which may be adjusted for a reason which will appear more fully hereinafter. The movable pivot point connection for the cam member is carried by a pivot assembly, which comprises a pair of interconnected links that are attached to a shaft, and spring biased to a predetermined position within the casing which encloses the mechanism. The shaft to which the pivot assembly is attached has imparted thereto rotation whenever the pivot assembly is moved, this shaft being operatively associated with and adapted to actuate a parking switch for the electric motor. The spring associated with the pivot assembly normally biases the same to a position in which the parking switch is maintained in the closed position.

The mechanism also includes an axially movable roller assembly, which is spring biased within the casing so that the roller is positioned out of alignment with the cam member. The roller assembly includes a pin, or rod portion, which may be engaged by a spring so that the roller is moved into alignment with the cam member. Consequently, upon swinging movement of the cam member by the arcuate operating link, the cam member will engage the roller so as to displace the movable pivot point thereof throughout a predetermined distance to increase the effective operating length of the connecting rod. The effective operating length of the connecting rod is increased by varying the angular relationship between a line intersecting the axes of the driving and driven member and a line intersecting the pivot point connections of the connecting rod. In this manner, the amplitude of oscillation imparted to the driven shaft, or member, is automatically increased to effect movement of the wiper blades out of the normal range of vision and against the cowl portion of the motor vehicle with which they are associated. Concurrently with the displacement of the movable pivot point of the cam member, the pivot assembly is moved throughout an angular distance sufficient to move the shaft associated therewith to a position wherein the parking switch is opened, thereby deenergizing the electric motor.

The parking switch employed with the instant actuating mechanism of the type disclosed in copending application, Serial No. 347,106, filed April 6, 1953, in the name of William K. Schnepf, now Patent No. 2,732,523. Moreover, the mechanism includes an artificial loading device of the type disclosed in copending application, Serial No. 387,473, filed October 21, 1953, in the name of Henry C. Rohr, now Patent No. 2,786,175. Accordingly, as will be more particularly pointed out hereinafter, the opening of the parking switch is "timed" so that the electric motor always has sufficient coasting motor inertia after deenergization to move the wiper blades to the proper parked position, where they will come to rest.

Further objects and advantages of the present invention will be apparent from the following description, reference being had to the accompanying drawing wherein a preferred embodiment of the present invention is clearly shown and wherein similar reference characters denote similar parts throughout the several views.

In the drawing:

Fig. 1 is a fragmentary view, in elevation, of the actuating mechanism with the linkage in one running position.

Fig. 2 is a view similar to Fig. 1 with the linkage in another running position.

Fig. 3 is a view similar to Fig. 1 with the linkage in the parked position.

Figure 6:
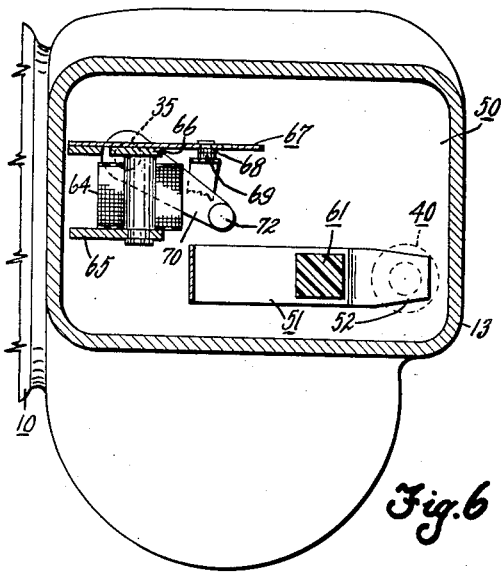
Fig. 6 is a sectional view taken along line 6—6 of Fig. 4.

With particular reference to Fig. 1, windshield wiper actuating mechanism is depicted as driven by a unidirectional D. C. electric motor 10, the armature shaft of which extends through an opening in the motor housing and is formed to constitute a worm 11 having a support 12, permitting end play adjustment at its free end. The support 12 is carried by the sidewall of a casing, or housing, 13, which encloses the actuating mechanism of this invention. With particular reference to Fig. 1, it may be seen that the worm 11 operatively engages a nylon worm gear 14, which is rotatably journalled on a stationary shaft 15, the shaft 15 disposed within the housing 13. The worm gear 14 carries a bearing, or crank pin, 16, which is eccentrically disposed with respect to the axis of the gear 14. A connecting rod 17 has one end pivotally connected to the crank pin bearing 16, in consequence of which the connecting rod will be continuously operated upon rotation of the worm gear, which constitutes the driving member of the mechanical movement to be described.

The other end of the connecting rod 17 is pivotally connected at 18 to the intermediate portion of an operating link 19 having an arcuate configuration. One end of the operating link 19 is pivotally connected at 20 to the end of an arm, or lever, 21, which is attached to a wiper actuating shaft, or driven member, 22. The linkage thus far described, is operable to impart oscillation to the shaft 22 upon rotation of the gear 14. The shaft 22 may be drivingly connected with a crank arm mechanism 23 having pivotal connection with links 24 and 25, that are operatively connected with a pair of wiper blades 26 and 27, which are movable over the surface of a windshield, not shown. However, it is to be understood that the transmission between the shaft 22 and the wiper blades 26 and 27 may take the form of a flexible cable, and the links disclosed herein are only shown by way of example.

Figure 4:
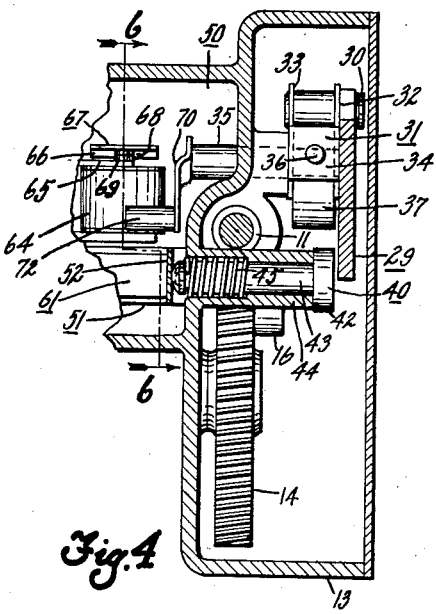
Fig. 4 is a sectional view taken along line 4—4 of Fig. 2, with certain parts removed.
Figure 5:
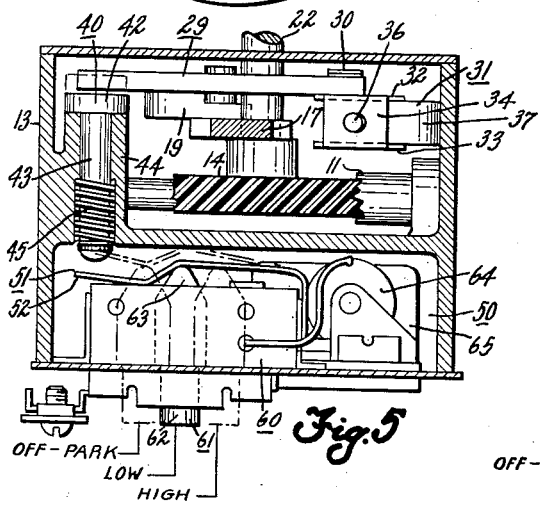
Fig. 5 is a sectional view taken along line 5—5 of Fig. 2.
Figure 7:
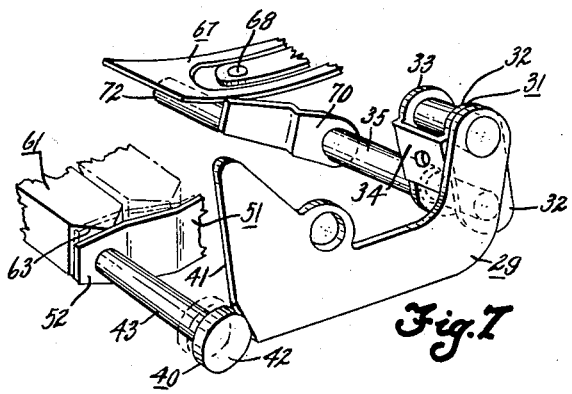
Fig. 7 is a fragmentary view, in perspective, of the mechanism for actuating the parking switch and the roller assembly.

The other end of the operating link 19 is pivotally connected at 28 to a cam member, or setting link, 29. One end of the cam member 29 carries a movable pivot point 30, the movable pivot point 30 being carried by a pivot assembly designated generally by the numeral 31. With particular reference to Figs. 4, 5 and 7, the construction of the pivot assembly 31 will be described. The pivot assembly comprises a pair of link members 32 and 33, which are interconnected by a bridging piece 34. The links 32 and 33 and the bridge piece 34 are connected to and supported by a shaft 35, which extends through a sidewall of the housing 13 and into a switch compartment, to be described. The bridge member 34 has connected thereto by means of a rivet 36, one end of a U-shaped spring 37, the other end of which bears against an inner wall of the housing 13 so as to normally position the pivot assembly 31 in a position shown in Figs. 1 and 2. The pivot assembly 31 engages a stop pin 31a formed integral with the housing 13, which stop pin limits counterclockwise movement of the pivot assembly by the spring 37.

Now, having reference to Figs. 1 through 3, the means for increasing the amplitude of oscillation imparted to the driven member 22 will be described. Figs. 1 and 2 depict the mechanism in the operating condition wherein the worm wheel 14 is rotated in a clockwise direction, the crank pin 16 being shown in its two extreme positions in Figs. 1 and 2. Rotation of the worm wheel will impart swinging movement to the connecting rod 17, which swinging movement is imparted to the operating link 19 and thereby transformed into oscillation of the shaft 22. During this movement, the cam member 29 merely has imparted thereto swinging movement about its pivot point 30. Under these conditions, and with the mechanism in the position shown in Fig. 2, the line A—A which intersects the axes of the driving and driven members will have an angular relationship with line B—B, which intersects the pivot point connections of the connecting rod, equal to the angle C. In order to vary the amplitude of oscillation imparted to the driven shaft 22, or more particularly increase the amplitude of oscillation imparted to the driven member, some means must be provided for varying the angular relationship between the lines A—A and B—B. Thus, as is shown in Fig. 3, the angular relationship between lines A—A and B—B is decreased so that they are separated only by the angle D, by which means the effective operating length of the connecting rod 17 is varied so as to increase the amplitude of oscillation imparted to the driven shaft 22.

The means for altering the angular relationship between the lines A—A and B—B comprise a roller assembly 40, the cam member 29 and the movable pivot point 30. The cam member 29 is formed with a cam surface 41, which is engageable with the roller 42 of the roller assembly 40. The roller assembly 40 also includes a shaft, or pin, 43, which is mounted within a sleeve 44 constituting an integral part of the housing 13. One end of the pin, or shaft, 43 is formed with an annular groove within which the end of a coil spring 45 is situated. The other end of the coil spring 45 bears against the internal shoulder on the sleeve 44 so that the spring 45 normally positions the roller 42 against the end of the sleeve 44, as shown in Figs. 4 and 5. When the roller 42 is in this position, it is out of alignment with the cam 29 and, accordingly, swinging movement of the cam 29 will not cause the cam surface 41 to engage the roller.

The end of the pin, or shaft, 43 projects into the switch compartment of the casing 13, the switching compartment being designated generally by the numeral 50. The switch compartment houses a spring member 51, the end portion 52 of which may be deflected so as to engage the end of shaft 43 and move the roller 42 to the dotted line position of Fig. 5. The means for deflecting the spring 51 will be described more fully hereinafter, and suffice it here to say that in moving the roller 42 to the dotted line position of Fig. 5, the cam surface 41 of the member 29 will engage the roller so as to displace the movable pivot point from the position shown in Fig. 2 to the position in Fig. 3. When the movable pivot point 30 is displaced throughout this predetermined distance, the angular relationship between lines A—A and B—B is altered from the angle C to the angle D whereupon the amplitude of oscillation imparted to the shaft 22 is automatically increased so as to move the wiper blades 26 and 27 through the angle E+D and to a parked position, as shown in Fig. 1.

With particular reference to Figs. 5 and 7, the means for deflecting the end 52 of the spring 51 will be described. The spring 51 is supported by a switch assembly designated generally by the numeral 60. The switch assembly includes a slidable plunger 61, which carries suitable contacts for energizing the electric motor 10. One end 62 of the plunger 61 is adapted for connection to a Bowden wire, or the like, and to a suitable operating member on the motor vehicle dashboard, not shown. The other end 63 of the plunger is disposed in contiguous relation to the spring 51, so that when the plunger 61 is moved to the "Off" position, the end 63 will deflect the spring 51 so that the end 52 thereof will displace the roller assembly 40 to the dotted line position of Fig. 5. The switch assembly 60 is electrically connected with an electromagnet 64.

With particular reference to Figs. 4, 5 and 6, it may be seen that the electromagnet 64 is supported by a bracket 65 within the switch chamber 50. The electromagnet 64 has associated therewith an armature 66 carried by a spring reed assembly 67. The electromagnet 64 constitutes a component part of the compensating parking switch, which is more particularly disclosed and claimed in aforementioned copending application Serial No. 347,106. The present invention includes means for actuating the parking switch, and more particularly includes means for deflecting the flexible spring reed 67 which carries a switch contact 68. The other switch contact 69, of the parking switch, is carried by the bracket 65. The winding of electromagnet 64 is connected with the switch 60 whereby all current flowing through the motor, passes through the electromagnetic winding 64 so that the force holding contacts 68 and 69 together is proportional to total motor current, or load.

With particular reference to Figs. 3, 4, 6 and 7, it may be seen that when the pivot assembly 31 is moved in a clockwise direction, the shaft 35 associated therewith is, likewise, moved in a clockwise direction. The shaft 35 has attached thereto an arm 70, which carries a pin 72. The pin 72 is disposed within the switch chamber 50 so that upon counterclockwise movement of the shaft 35, as viewed in Fig. 6, or clockwise movement of the shaft 35, as viewed in Fig. 7, the pin 72 will engage the reed 67, and thereby tend to separate contacts 68 and 69, which separating tendency is opposed by reason of the electromagnet 64 attracting the armature 66. The timing function of the compensating electromagnet 64 is more particularly described in the aforementioned copending application, Serial No. 347,106, and suffice it here to say that the electromagnet 64 does not permit the pin 72 to separate contacts 68 and 69, thereby deenergizing the motor 10, until the motor has sufficient coasting inertia to move the wiper blades to the parked position, as shown in Fig. 1. Thus, the electromagnet 64 times the opening of the parking switch so that the motor always has sufficient inertia to move the wiper blades to the parked position, and also assures that when the wiper blades reach the parked position, the motor will be at a standstill so that the wiper blades will not over travel.

With reference to Figs. 1 through 3, it may be seen that the actuating mechanism also includes an artificial loading spring 75 having a hump 76 adapted for engagement with the pivot pin 20, when the mechanism is adjusted to park the wiper blades. This artificial loading spring 75 is more particularly described in the aforementioned copending application Serial No. 347,473, and suffice it here to say that the spring 75 merely assists the electromagnet 64 in properly timing the opening of the contacts 68 and 69 under all windshield surface conditions. The hump 76 also latches the pin 20 in the parked position so as to positively prevent over-travel of the wiper blades 26 and 27.

Figure 8:
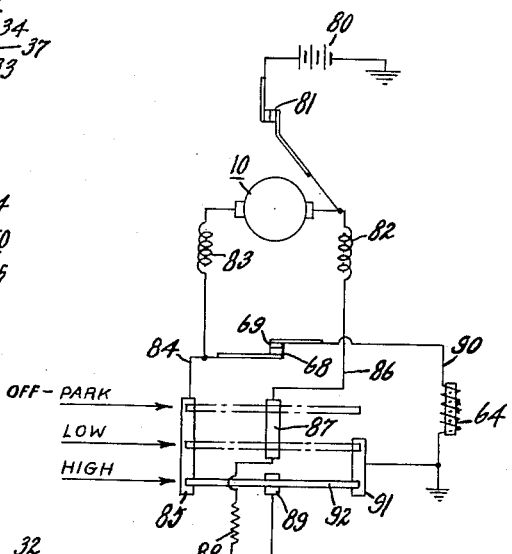
Fig. 8 is a schematic diagram of the electrical circuit and switch means for controlling the wiper motor.

Now with reference to Fig. 8, the energizing circuit for the electric motor 10 will be more particularly described. As seen in Fig. 8, the energizing circuit includes a battery 80, one terminal of which is connected to ground and the other terminal of which is connected through a motor overload switch 81 to one side of the armature of motor 10 and one end of the shunt field winding 82. The armature is connected through the series field winding 83 to a wire 84, which is connected to the parking switch contact 68. The wire 84 is also connected to a switch contact 85. The other end of the shunt field winding 82 is connected by a wire 86 to a switch contact 87, one end of the switch contact 87 being connected through a resistor 88 to a switch contact 89. The other parking switch contact 69 is connected by a wire 90 through the electro-magnetic winding 64 to ground. The switch also includes a contact 91, which is connected to ground, and a bridging member 92, which is moved by the plunger 61. From the circuit arrangement shown in Fig. 8, it is apparent that when the bridging member is in the high speed position, the resistor 88 will be connected in series with the shunt field so that the motor 10 will operate at a high speed. When the bridging member 92 is moved to the low position, the resistor 88 is short-circuited so that the motor 10 operates at a low speed. When the bridging member 92 is moved to the parked position, it may be seen that the parking switch, including contacts 68 and 69, controls the energization of motor 10. Accordingly, when the contacts 68 and 69 are opened, which is only accomplished when the amplitude of oscillation imparted to the shaft 22 is increased, the motor 10 will be deenergized and the blades 26 and 27 will be parked by coasting motor inertia.

In operation, oscillatory movement throughout the angle E is imparted to the wiper blades 26 and 27 when the motor 10 is energized and the plunger 61 is in either the low or high positions depicted in Fig. 5. However, as soon as the plunger 62 is moved to the "Park" or "Off" position, as shown in Fig. 5, swinging movement of the cam 29 will result in engagement of the surface 41 thereof with the roller 42 so that the pivot point 30 is displaced. Thereafter, the amplitude of oscillation imparted to the driven shaft is automatically increased by reason of the effective operating length of the connecting rod 17 being increased, and the shaft 35 is rotated so that the pin 72 is moved into position to separate the parking switch contacts 68 and 69. However, by reason of the winding of electromagnet 64 being in series with the total motor current, and by reason of the artificial loading spring 75 imposing an additional load on the motor by its enagement with pivot pin 20, the opening of the parking switch contacts 68 and 69 will be effectively "timed" so that the motor 10 will always have sufficient inertia after deenergization to move the wiper blades to the parked position.

From the aforegoing, it is manifest that the present invention provides a compact actuating mechanism for power driven windshield wipers. Moreover, the mechanism disclosed herein may be operated by the simple manipulation of a single control element.

While the embodiment of the present invention as herein disclosed, constitutes a preferred form, it is to be understood that other forms might be adopted.

What is claimed is as follows:

1. In apparatus of the character described, an element mounted to be alternately oscillated, a movable operating member connected at one end to oscillate said element, a setting link having a cam surface thereon movably connected at the other end of said operating member, means applying swinging force to said member and link at a point substantially intermediate the ends of said member, a movable pivot point connection for the free end of said setting link, and retractable means constructed and arranged to engage the cam surface of said setting link during its swinging movement so as to automatically displace said movable pivot connection.

2. Means for operating a member including, an oscillatable actuating shaft having an arm extending therefrom, including in combination, an operating member swingably connected with said arm at one end, a setting element having a cam surface thereon swingably connected to the other end of said operating member, means applying operating force to said operating member at a point between the ends thereof, a movable pivot connection for said setting element, and retractable means constructed and arranged to engage the cam surface of said setting element during its movement so as to automatically displace said movable pivot connection.

3. In a mechanical movement of the character described, a rotatable driving member, an oscillatable driven member, means operatively interconnecting said members constructed and arranged to impart oscillation to said driven member upon rotation of said driving member including an operating link, one end of which is pivotally connected to said driven member, a setting link having pivotal connection with the other end of said operating link, said setting link having a cam surface thereon, and a connecting rod, opposite ends of which are pivotally connected with said driving member and an intermediate portion of said operating link, a movable pivot point for said setting link, and retractable means adapted to operatively engage the cam surface of said setting link during movement thereof to automatically displace said pivot point whereby the effective operating length of the connecting rod is altered so as to vary the amplitude of oscillatory movement transmitted to said driven member.

4. In a mechanical movement of the character described, a rotatable driving member, an oscillatable driven member, means operatively interconnecting said members constructed and arranged to impart oscillation to said driven member upon rotation of said driving member including an operating link, one end of which is pivotally connected to said driven member, a setting link having pivotal connection with the other end of said operating link, and a connecting rod, opposite ends of which are pivotally connected with said driving member and an intermediate portion of said operating link, a movable pivot point for said setting link, said setting link having formed thereon a cam surface, and means for displacing said movable pivot point of said setting link comprising a movable element, said movable element being constructed and arranged to engage the cam surface of said setting link and thereby displace said movable pivot point during swinging movement of said setting link by said operating link so as to vary the amplitude of oscillatory movement imparted to said driven member.

5. The combination set forth in claim 4 wherein the means for displacing the movable pivot point of said adjusting link includes a spring engageable with said movable element, said spring being capable of imparting movement to said element so as to move the same into alignment with said setting link.

6. Windshield wiper actuating mechanism including in combination, a rotatable driving member, an oscillatable driven member, an electric motor operatively associated to said driving member for effecting rotation thereof, means interconnecting said members constructed and arranged to impart oscillation of fixed magnitude to said driven member upon rotation of said driving member, said means including an operating link having operative connection with said driven member and a connecting rod having one end pivotally connected to said driving member, the other end of said connecting rod being pivotally connected to an intermediate portion of said operating link, means to vary the angular relationship between a line intersecting the pivot point connections of the connecting rod and a line intersecting the axes of the driving and driven members so as to vary the amplitude of oscillation imparted to said driven member, and automatic switch means operable to deenergize said motor, said automatic switch means being operatively associated with the connecting rod whereby the automatic switch means is only operable to deenergize the motor when the position of the connecting rod has been adjusted so as to vary the amplitude of oscillation imparted to said driven member.

7. Windshield wiper actuating mechanism including in combination, a rotatable driving member, an oscillatable driven member, an electric motor operatively connected to said driving member for effecting rotation thereof, an operating link having one end pivotally connected to said driven member, a cam member having pivotal connection with the other end of said operating link, a movable pivot point for said cam member, a connecting rod having one end pivotally connected to said driving member and the other end pivotally connected to an intermediate portion of said operating link whereby rotation of said driving member will impart oscillation of fixed magnitude to said driven member, means engageable with said cam so as to displace the movable pivot point thereof and vary the amplitude of oscillation imparted to said driven member upon rotation of said driving member, and automatic switch means operable to deenergize said motor, said automatic switch means being operatively associated with the movable pivot point of said cam member whereby the automatic switch means is only operable to deenergize said motor when the movable pivot point of said cam member has been displaced.

8. The combination set forth in claim 7 wherein said movable pivot point of the cam member is carried by a pivot assembly which includes an element constructed and arranged to actuate said automatic switch means when the pivot assembly is moved by displacement of said movable pivot point.

9. The combination set forth in claim 7 wherein the means engageable with said cam member includes a movable roller, and means for moving said roller into alignment with said cam member so that the cam member engages the roller and said movable pivot point is displaced during rotation of the driving member.

10. The combination set forth in claim 9 wherein a manual switch is provided for controlling the energization of said electric motor, said manual switch including an operating member which is operable to concurrently open said manual switch and effect movement of said roller, said automatic switch means being connected in shunt around said manual switch means so as to continue energization of said motor until said automatic switch means is opened by displacement of said movable pivot point.

11. The combination set forth in claim 7 wherein said movable pivot point is carried by a pivot assembly, said pivot assembly being attached to a rotatable shaft whereby displacement of said movable pivot point effects angular movement of said shaft, said shaft being operatively associated with said automatic switch means so as to effect opening thereof upon displacement of said movable pivot point, and wherein the means engageable with the cam member for displacing said movable pivot point includes a roller, and manually actuated means for displacing said roller so as to effect engagement between the roller and the cam so as to displace said movable pivot point.

12. Windshield wiper actuating mechanism including in combination, a rotatable driving member, an electric motor operatively connected to said driving member for effecting rotation thereof, a source of electric current, a circuit arrangement interconnecting said source of electric current and said motor including a manually operable switch, an oscillatable driven member, means operatively interconnecting said driving and driven members constructed and arranged to impart oscillation to said driven member upon rotation of said driving member including a connecting rod having one end pivotally connected to said driving member, an operating link having one end pivotally connected to said driven member, the other end of said connecting rod having pivotal connection with the intermediate portion of said operating link, and a cam member having a movable pivot point, said cam member being pivotally connected to the other end of said operating link, and means including a spring which is deflected concurrently with the opening of said manual switch for displacing said movable pivot point so as to vary the amplitude of oscillation imparted to said driven member.

13. Windshield wiper actuating mechanism including in combination, a rotatable driving member, an electric motor operatively connected to said driving member for effecting rotation thereof, a source of electric current, a circuit arrangement interconnecting said source of electric current and said motor including a manually operable switch and automatic switch means connected in shunt with said manual switch, an oscillatable driven member, means operatively interconnecting said driving and driven members constructed and arranged to impart oscillation to said driven member upon rotation of said driving member including a cam member having a movable pivot point, and means including a spring which is deflected concurrently with the opening of said manual switch for displacing said movable pivot point so as to vary the amplitude of oscillation imparted to said driven member, said automatic switch means being operatively associated with said movable pivot point so that upon displacement of said movable pivot point said automatic switch means will be opened after said manual switch has been opened.

References Cited in the file of this patent

UNITED STATES PATENTS

| | | |
|---|---|---|
| 2,197,559 | Milulasek | Apr. 16, 1940 |
| 2,403,233 | Patch | July 2, 1946 |
| 2,452,496 | Schneider et al. | Oct. 26, 1948 |
| 2,491,697 | Vischulis | Dec. 20, 1949 |

FOREIGN PATENTS

| | | |
|---|---|---|
| 909,896 | Germany | Apr. 26, 1954 |